UNITED STATES PATENT OFFICE.

WILLARD E. CASE, OF AUBURN, NEW YORK.

ELECTROLYTIC LIQUID FOR SECONDARY BATTERIES.

SPECIFICATION forming part of Letters Patent No. 305,737, dated September 30, 1884.

Application filed February 2, 1884. (No specimens.)

*To all whom it may concern:*

Be it known that I, WILLARD E. CASE, of Auburn, Cayuga county, New York, have invented a new and useful Improvement in Electrolytic Liquids for Storage-Batteries, of which the following is a specification.

The invention consists in a neutral electrolytic liquid for storage-batteries, preferably so compounded that no caustic hydrate is formed in the cell during electrolysis.

I practically apply my invention as follows: A solution of sulphate of zinc has been found suitable as an electrolytic liquid in storage-batteries. The electrodes may, for example, be of lead prepared in any suitable manner. While the cell is being charged zinc is deposited from the solution and upon the hydrogen electrode, while lead oxide is formed on the oxygen electrode. The deposited zinc tends to prevent polarization and conserves the hydrogen, which otherwise would escape from the hydrogen electrode. When, however, the zinc from the zinc-sulphate solution is deposited, as above described, it wastes away by local action caused by the sulphuric acid set free in the solution attacking the zinc, and the same liberated acid produces local action between the lead oxide and the metallic lead. The result is a great waste of energy, and consequently a shortening of the period during which the cell should yield a current after it has been charged, and which will not produce a caustic hydrate during electrolysis. I obviate this difficulty by introducing into the sulphate-of-zinc solution any substance—as, for example, magnesium oxide—with which the acid from the zinc sulphate will combine to produce a neutral compound while the cell is being charged. In this case of magnesium oxide there will be produced magnesium sulphate, which is a neutral salt. As the cell discharges, the magnesium sulphate is decomposed, the sulphuric acid therein combining with the zinc to form zinc sulphate, and the magnesium with the oxygen of the water to form magnesium oxide, which is not caustic and does not chemically affect the lead peroxide, when the conditions become substantially the same as before the cell was charged. The amount of magnesium oxide or other neutralizing substance to be added will of course depend upon the quantity of zinc deposited or acid set free from the zinc-sulphate solution. Such a quantity should be used as will at least furnish enough magnesium to satisfy the affinity of the liberated sulphuric acid, and an excess may be employed without injury. Any chemist knowing the atomic weights of the elements entering into the reactions can easily determine the proper proportion of neutralizing substance to produce the desired result. A storage-cell containing a zinc negative plate or its equivalent, a lead positive plate, and a sulphate-of-zinc liquid containing in solution magnesium oxide I have found to give a strong and continuous current. It needs little or no rest to recover itself, as the zinc sulphate formed during the discharge is soluble, and hence no scum of insulating sulplate is formed on the hydrogen electrode, as in the Planté cell. Local action is prevented at the zinc plate and between the lead oxide and metal of the lead plate.

The electrolytic liquid described in the foregoing, consisting of a solution of zinc sulphate to which magnesium oxide is added, gives excellent results, and is the one which I prefer to use in practice; but I do not limit myself to a neutral electrolytic liquid necessarily containing sulphate of zinc added directly thereto, because it will be obvious that with a lead electrode and a zinc electrode, for example, in the cell a solution of magnesium sulphate only can be used, which, as before stated, is a neutral salt, and which will not form a caustic hydrate during electrolysis. In such case on the first charging, hydrogen will be given off the negative zinc plate and oxygen will attack the positive lead plate, forming lead peroxide. On the discharge of the cell the sulphuric acid set free from the magnesium sulphate will attack the zinc plate, making zinc sulphate, so that after the first charging and discharging of the cell the solution, in addition to magnesium sulphate, contains zinc sulphate. It will be seen therefore that I can make the electrolytic liquid directly from a solution of sulphate of zinc and a solution of magnesium oxide, for example, and in such case I may use two lead electrodes, or a lead electrode and a zinc electrode, but not necessarily a zinc electrode; or I may make the liquid of a solution of magnesium sulphate and form the zinc sulphate by the action of the cell; but in this case I necessarily employ one zinc electrode with a second electrode of a less oxidizable material.

Where I use simply a neutral salt solution which will not form a caustic hydrate on electrolysis, one electrode may be of any suitable metal and the other electrode of any material or metal of a less oxidizable character. When the cell is discharged, the acid set free from the neutral salt combines with the more highly oxidizable metal electrode, and the neutral salt is therefore decomposed on the discharging of the cell and remains decomposed until the cell is charged again. With a neutral salt solution, as described, I may, however, use two electrodes of lead. In this case the salt is practically not decomposed, or, more strictly, the decomposition is immediately followed by recomposition during both the charging and discharging of the cell.

I claim as my invention—

1. In a secondary or storage cell, an electrolytic liquid containing in combination a solvent or suspending fluid and two substances, one of which may be decomposed to yield a free acid, the other substance being capable of uniting with said acid to neutralize said acid without the formation of a caustic hydrate during electrolysis, substantially as described.

2. In a secondary or storage cell, an electrolytic liquid containing in combination a solvent or suspending fluid and two substances, one of which may be decomposed to yield a free acid, and also a metallic deposit at the cathode, the other substance being capable of uniting with said acid to neutralize said acid without the formation of a caustic hydrate during electrolysis, substantially as described.

3. In a secondary or storage cell, and in combination with a metal negative electrode and an electrode of less oxidizable metal or material contained therein, an electrolytic liquid containing a neutral salt, which salt on the charging of the cell is decomposed into an acid, and a non-caustic hydroxide, substantially as described.

4. In a secondary or storage cell, and in combination with two lead electrodes contained therein, an electrolytic liquid containing a neutral salt, which salt on both the charging and discharging of the cell is decomposed into an acid and a non-caustic hydroxide, substantially as described.

5. In a secondary or storage cell, and in combination with the electrodes thereof, an electrolytic liquid containing a neutral salt, which salt on the charging of the cell is decomposed into an acid and a non-caustic hydroxide, substantially as described.

6. In a secondary or storage cell, the combination of a neutral electrolytic liquid and sulphate of magnesium, substantially as described.

7. In a secondary or storage cell, an electrolytic liquid containing zinc sulphate and magnesium oxide, as and for the purposes set forth.

WILLARD E. CASE.

Witnesses:
WM. A. FRENCH,
A. E. SAXTON.